INVENTORS:
PAUL E. CARLSON
KEITH W. RACE
BY

THEIR ATTORNEYS

Oct. 28, 1969 P. E. CARLSON ETAL 3,474,888

LUBRICATION SYSTEM FOR WET CLUTCHES

Filed June 26, 1967 2 Sheets-Sheet 2

INVENTORS
PAUL E. CARLSON
KEITH W. RACE
BY

THEIR ATTORNEYS

United States Patent Office 3,474,888
Patented Oct. 28, 1969

3,474,888
LUBRICATION SYSTEM FOR WET CLUTCHES
Paul E. Carlson, Williamsport, and Keith W. Race, Hagerstown, Md., assignors to Mack Trucks, Inc., Allentown, Pa., a corporation of New York
Filed June 26, 1967, Ser. No. 648,865
Int. Cl. F16d *13/60, 25/00, 19/00*
U.S. Cl. 192—113       9 Claims

ABSTRACT OF THE DISCLOSURE

Lubricating systems for wet plate clutches characterized by a device for increasing the lubricant level in the clutch housing when the clutch plates are disengaged to enable a collector rotatable with the drive plates of the clutch to collect and supply lubricant to the clutch plates. The lubricant level control device decreases the level of the lubricant in the clutch housing to below the level of the collector ring and clutch elements when the clutch plates are engaged, thereby to reduce loss of power and heating of the lubricant when the clutch is in power transmitting engagement.

---

Figure 1:
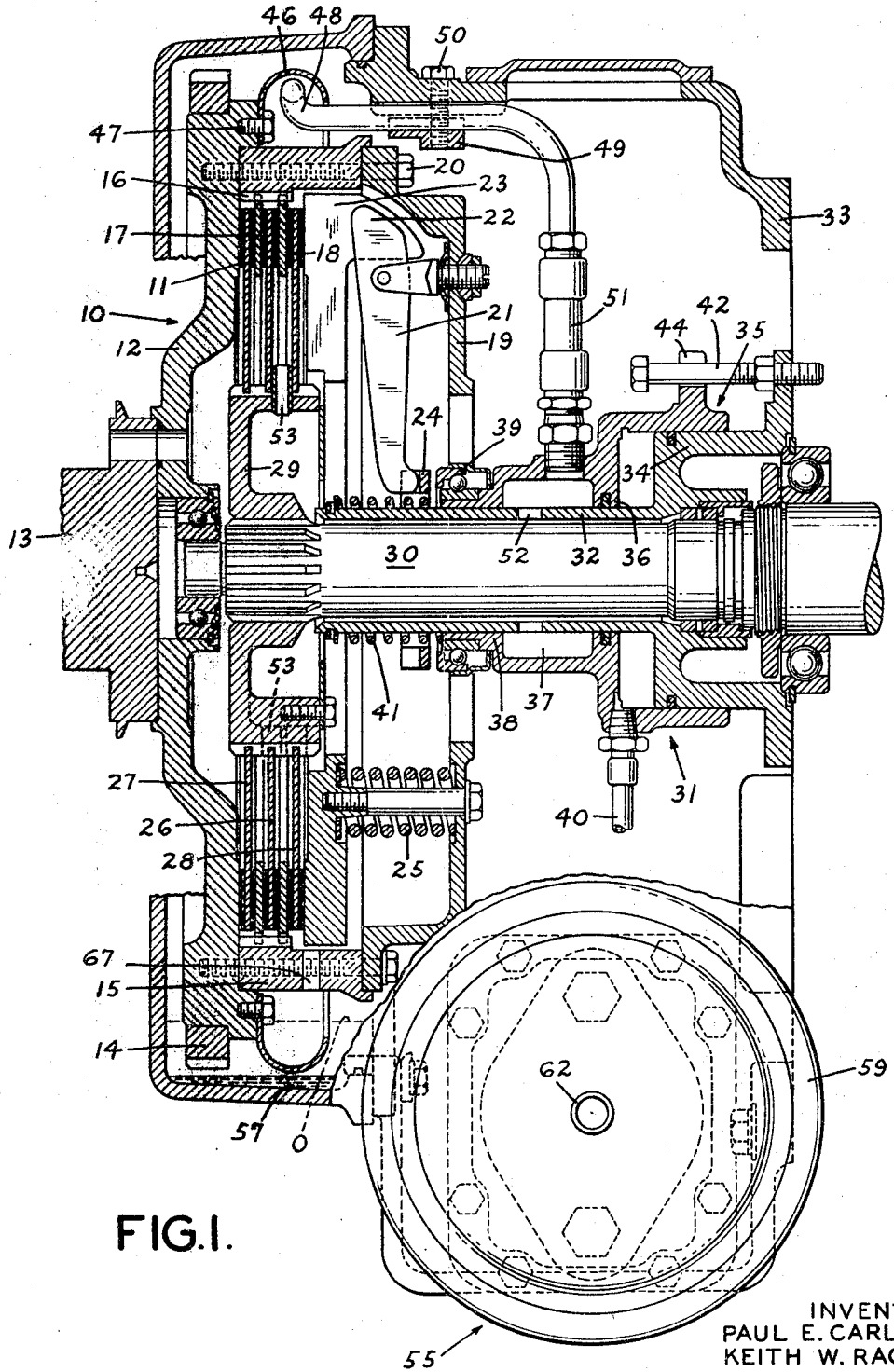

This invention relates to improvements in the lubrication of wet plate clutches, and more particularly to systems for supplying lubricant, hereinafter referred to as "oil," to the clutch plates of wet clutches of the type used in motor vehicles and the like.

Wet plate clutches have been used for many years and a number of systems have been provided heretofore for supplying oil from a sump in the clutch housing or the transmission housing to the plates of such clutches. The most common form of lubrication system involves merely the immersing of the clutch casing or the flywheel of the engine forming a part of the clutch in the oil which is then splashed by the rotation of the flywheel throughout the housing and over the plates of the clutch. Other systems involve collectors of one type or another which withdraw some of the oil in the transmission or clutch housing and supply it to the nozzles or jets which direct the oil into the interior of the clutch for flow outwardly between the plates thereof.

In almost all of such prior systems, it has been found that the oil is heated to such an extent that an oil cooler is required in order to avoid overheating of the clutch and transmission. Overheating is caused by a combination of the energy expended during slippage of the clutching elements and in splashing and churning the oil in the clutch or transmission housing, such energy being converted into heat. In many instances, the energy lost in the form of heat may amount to several horsepower.

In accordance with the present invention, a wet clutch lubricating system is provided whereby effective lubrication of the clutch plates with oil occurs only at the time when they are disengaged and splashing of the oil when the clutch is engaged is reduced to a minimum, with a proportionate increase in effective horsepower output of the engine and reduction of oil temperature.

More particularly, in accordance with the present invention, the clutch is provided with a collector ring which, when immersed in oil in the clutch or transmission housing, will carry it around by a centrifugal force and friction and discharge it into a conduit which delivers the oil to the inner edges of the clutch plates so that the oil is thrown out between the clutch plates and wets and lubricates them while the plates are disengaged.

In order to minimize loss of power and heating of the oil, the new system includes means for raising and lowering the oil level in the transmission or clutch housing so that the collector ring is immersed in oil while the clutch plates are disengaged and the ring and other clutch components are essentially out of engagement with the oil in the clutch or transmission housing when the clutch plates are engaged in driving relation. The level of the oil may be such as to partially engage the clutch and ring elements when the flywheel and clutch are not rotating even though the level is in the lower portion. However, when the components are rotating a quantity of oil is always in suspension resulting in essentially a condition wherein the splashing is minimal. By avoiding the excessive splashing of the oil, the temperature of the oil with the new system is maintained at a level compatible with acceptable temperature levels of known lubricants and may be as much as 150° lower than a similar clutch not having means for raising and lowering the oil level in the clutch housing.

It should be pointed out that an additional feature of this invention is the recirculation of the lubricant. The path of the oil is such that essentially all of the circulating oil is directed through the clutch and flows directly into the collector ring without the necessity for repeated pick-up from the sump in the clutch housing. Experience has shown that a relatively high level is required in order to supply an adequate quantity of oil to the ring if no recirculation means is used.

This invention includes an essentially closed circuit such that the oil being picked up by the tube is directed through the input shaft area, and further directed into the clutch hub and plates to avoid a minimum of splash and loss. A series of holes in the outer periphery of the clutch flywheel adapter ring mounted to the flywheel directs the oil into the collector ring resulting in a minimum of loss of the oil and immediate pick-up of the oil by the tube, without the necessity for passing through the sump area of the housing. This further reduces churning losses and when in combination with the raising and lowering feature results in a satisfactory operating temperature of the oil.

Figure 2:
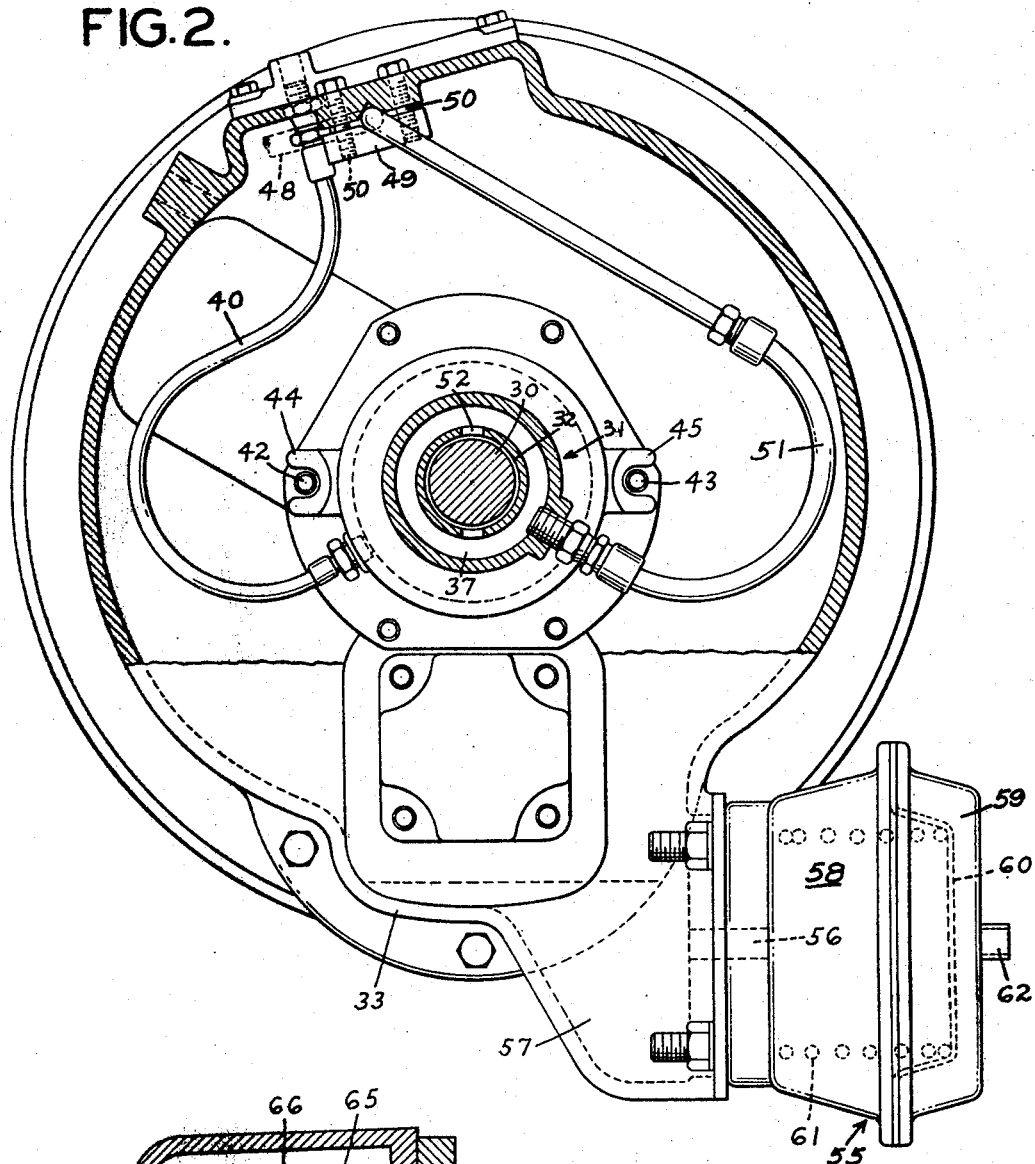
Figure 3:
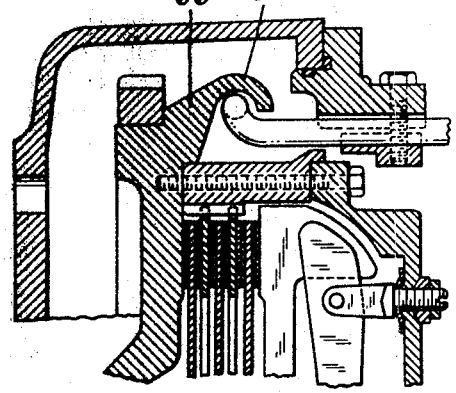

For a better understanding of the present invention, reference may be had to the accompanying drawings, in which FIGURE 1 is a side of elevational view partially broken away and partially in vertical section of a typical clutch, including the lubrication system embodying the present invention;

FIGURE 2 is an end elevational and partially broken away view of certain connections shown in positions displaced from those illustrated in FIGURE 1 for a better illustration of the invention; and FIGURE 3 is a cross-sectional and fragmentary view of a portion of a modified form of the lubrication system.

The clutch 10 chosen for purposes of illustration is conventional in construction and may include a clutch face 11 on the engine flywheel 12 which is fixed to the crankshaft 13 of an engine. A starter gear 14 is mounted on the flywheel in the usual way. Bolted to the flywheel 12 is a rim 15 provided with internal splines 16 on which are slidably splined ring-like clutch plates 17 and 18. A clutch cover 19 is also secured to the rim 15 and flywheel 12 by means of the bolts 20. Pivotally mounted on the clutch cover 19 are a plurality of clutch release levers 21, only one of which is shown, having their outer ends 22 pivotally connected to the clutch pressure plate 23 in any suitable way so that upon movement to the left as viewed in FIG. 1 of the clutch release collar 24 connecting the inner ends of the clutch levers 21, the clutch pressure plate 23 will be moved to the right and the clutch disengaged. Coil springs 25 interposed between the cover 19 and the pressure plate 23 normally urge the pressure plate 23 and the clutch plates 17, 18 toward the interposed disk-like clutch plates 26, 27 and 28 which are mounted on a splined hub 29 carried by the output shaft 30.

In the clutch disclosed, the clutch plates are disengaged by an air pressure system, although a mechanical linkage or its equivalent may be used instead. The air system includes a housing 31 which is slidable lengthwise of a sleeve or quill shaft 32 spaced radially from the output shaft and fixed to the transmission housing 33 in any suitable way. The quill shaft has at its inner end an enlarged cylindrical piston portion 34 which is received slidably in a cylinder 35 in the housing 31 and including an inwardly extending flange 36 in sliding and sealed engagement with the exterior of the quill shaft 32. An annular passage or chamber 37 is formed in the housing 31 to the left of the flange 36 and a bearing portion 38 on the housing 31 slidably engages the quill shaft and carries a clutch release bearing 39 movable with the housing 31, into and out of engagement with the release collar 24. In order to release the clutch, air is supplied through a conduit 40 to the cylinder 35, from a source of compressed air under the control of a valve activated by a clutch pedal, these elements not being illustrated. Admission of compressed air into the cylinder 35 forces the housing 31 to the left as viewed in FIG. 1, relative to the fixed piston 34 and engages the clutch release bearing 39 with the collar 24 and rocks the levers 21 in a clockwise direction. The clutch plates are engaged upon release of pressure in the cylinder 35 by the action of the springs 25 and, if necessary, a coil spring 41 encircling the quill shaft and engaging the bearing portion 38 on the housing 31.

It will be understood that the conduit 40 is flexible to accommodate the shifting movement of the cylinder but a rigid air conduit can be used if the air port for the cylinder 35 is mounted in the piston portion 34. The housing 31 is retained against rotation and is guided by means of guide bolts 42 and 43 threaded into the housing 33 and slidably received in bifurcated flanges 44 and 45 extending from the housing 31.

As indicated above, the clutch mechanism thus far described is conventional.

In accordance with the present invention, the system for lubricating the clutch rings and plates includes an annular channel member 46 of semi-circular cross-section fixed to the flywheel 12 by means of screws 47 or to any other rotary portion of the clutch, such as the rim 15 or the cover 19. The ring 46 serves to collect oil O from the bottom of the clutch or transmission housing 33 and by centrifugal force and friction deliver it and discharge a portion of it into the open end of a pipe 48, facing counter to the direction of rotation of the flywheel as shown in FIG. 2. The pipe 48 has a right-angularly related portion secured to the top of the transmission or clutch housing 33 by means of a clamping block 49 and screws 50. Coupled to a downwardly extending portion of the conduit 48 is a flexible tube or conduit 51 which supplies oil to the chamber 37 from which it flows through openings 52 in the quill shaft 32 between the output shaft 30 and the quill shaft and is discharged into the interior of the hub 29. Rotation of the hub 29 causes the oil to be thrown out through tubes or passages 53 between the clutch plates and clutch rings to wet and lubricate their surfaces and carry away heat.

The above description assumes that during the operation of the engine and while the clutch plates are disengaged, the level O of the oil in the housing 33 is at least as deep as the dotted line position shown in FIG. 1. However, during the normal operation of the clutch in an engaged position, the oil level in the bottom of the transmission housing is maintained below the level of the ring 46 and the flywheel and the starter gear 14 thereon to reduce splashing of the oil to a minimum and to avoid waste of horsepower and heating of the oil. To that end, a diaphragm-type air cylinder 55 is mounted on the lower portion of and outside the housing 33 and communicates by means of a passage 56 with a sump 57 in the bottom of the housing.

As best shown in FIG. 2, the air cylinder 55 includes a pair of opposed cup-shape casings 58 and 59 between the edges of which is clamped a flexible diaphragm 60 formed of a material resistant to damage by oil, such as neoprene or neoprene-coated fabric. The diaphragm divides the air cylinder into an air-receiving chamber within the casing 59 and an oil-receiving chamber within the casing 58.

Oil is introduced into the oil-receiving chamber and into the sump 57 to the level shown in full line in FIG. 1 and dotted line in FIG. 2 when the diaphragm 60 is deflected to the position shown in FIG. 2 by means of the coil spring 61 interposed between the end of the casing 58 and the diaphragm. The oil level in the sump 57 in the bottom of the housing 33 is raised to the dotted line level shown in FIG. 1 to enable lubrication of the clutch by admitting air through inlet coupling 62 into the air-receiving chamber in the casing 59, thereby forcing the diaphragm to the left and forcing oil from the chamber in the casing 58 through the passage 56 into the sump 57. The level of the oil is lowered by relief of air pressure in the air-receiving chamber and by the action of the spring 61 which forces the diaphragm 60 to the right. The movement of the diaphragm can be synchronized with the release and engagement of the clutch by supplying air to and discharging it from the air chamber 59 by means of the same valve which controls the air for actuating the clutch. In this way, the oil level in the sump 57 and the bottom of the housing 33 is raised as the clutch disengages so that the oil is supplied to the clutch plates while the clutch is disengaged and the oil level is essentially dropped below the collector ring and the flywheel and other clutch components as the clutch engages. To maintain a circulation of oil during disengagement of the clutch, the rim 15 is provided with a series of holes 67 which direct oil passing between the clutch plates into the collector ring 46 from which it is returned by the pipe 48 to the interior of the clutch. Recirculation of the oil has the dual advantages of carrying heat away from the clutch and reducing splashing and slinging of the oil. During normal driving operation of the clutch, slinging or splashing of oil by the clutch and flywheel is reduced to a minimum and horsepower losses and overheating of the oil are reduced.

While an air system has been described for actuating the clutch and for raising and lowering the level of the oil, it will be understood that other equivalent means may be provided, such as a mechanical linkage of conventional type for actuating the clutch together with a piston-type pump actuated by the clutch pedal to raise and lower the oil level. Also, if desired, electrical means may be provided for the same purpose.

The above-described system is adapted for installation in clutches previously manufactured and installed in vehicles inasmuch as the collector ring can be attached to an existing flywheel and the other components can also be adapted to such an existing clutch. On the other hand, the collector ring can be made an integral part of a flywheel or a clutch as shown in FIG. 3. In this form of the invention, the collector ring 65 consists of a flange of arcuate cross-section extending laterally from and integral with the flywheel 66.

Other variations and modifications of the system are possible, such as, in the arrangement of the passages for flow of oil from the collector ring to the hub of the clutch, the design and arrangement of the plates in the clutch and the location and arrangement of the passages by means of which oil is discharged from the hub against the plates of the clutch.

We claim:

1. A lubricating system for a wet plate clutch having engageable and disengageable clutch plates for coupling and uncoupling a rotatable drive member and a driven member, comprising means for engaging and disengaging said clutch plates, a housing for said clutch having an oil sump therein below said clutch, means responsive to operation of said clutch engaging and disengaging means for raising the level of oil in said sump when said clutch plates are disengaged and lowering the level of the oil in said sump out of contact with said clutch when said clutch plates are engaged and means rotatable with said clutch and immersible in said oil when said oil level is increased for supplying oil to said clutch plates, said rotatable means being disposed above the level of said oil in said sump when said level is lowered to discontinue the supply of oil to said clutch plates and minimize splashing of said oil by said clutch when said clutch plates are engaged.

2. The lubricating system set forth in claim 1 in which said means for supplying oil to said clutch plates comprises a collector ring mounted on the periphery of said clutch and a conduit for discharging oil from said collector ring adjacent to the inner peripheries of said clutch plates.

3. The lubricating system set forth in claim 1 in which said means for raising and lowering the level of the oil in said sump comprises a chamber for receiving oil communicating with said sump and means responsive to said engaging and disengaging means for decreasing and increasing the capacity of said chamber to discharge oil into and withdraw oil from said sump.

4. The lubricating system set forth in claim 1 in which said means for raising and lowering the level of the oil in said sump comprises a chamber for receiving oil communicating with said sump and means responsive to said engaging and disengaging means for decreasing and increasing the capacity of said chamber to discharge oil into and withdraw oil from said sump, and said means for supplying oil to said clutch plates comprises a collector ring mounted on the periphery of said clutch and a conduit for discharging oil from said collector ring adjacent to the inner peripheries of said clutch plates.

5. The lubricating system set forth in claim 1 in which said means for raising and lowering the level of said oil in said sump comprises an air cylinder having a diaphragm therein dividing said cylinder into an oil-receiving chamber and an air-receiving chamber, means connecting said oil-receiving chamber to said sump, and air pressure means responsive to said clutch plate engaging and disengaging means for introducing air under pressure into and discharging air from said air-receiving chamber to deflect said diaphragm and discharge oil into and withdraw oil from said sump.

6. The lubricating system set forth in claim 1 in which said clutch comprises a flywheel fixed to said drive member, a casing fixed to said flywheel and enclosing said clutch plates, and a hollow hub fixed to said driven member, some of said clutch plates being connected on said flywheel and others of said clutch plates being connected to said hub, and in which said means for supplying oil to said clutch plates comprises a collector ring mounted on said flywheel, a conduit having an open end positioned adjacent to said collector ring for discharging oil from said collector ring into said hollow hub, and passages in said hub for directing oil against clutch plates.

7. The lubricating system set forth in claim 1 in which said means for raising and lowering the level of said oil in said sump comprises an air cylinder having a diaphragm therein dividing said cylinder into an oil-receiving chamber and an air-receiving chamber, means connecting said oil-receiving chamber to said sump, and air pressure means responsive to said clutch plate engaging and disengaging means for introducing air under pressure into and discharging air from said air-receiving chamber to deflect said diaphragm and discharge oil into and withdraw oil from said sump, and said clutch comprises a flywheel fixed to said drive member, a casing fixed to said flywheel and enclosing said clutch plates, and a hollow hub fixed to said driven member, some of said clutch plates being connected on said flywheel and others of said clutch plates being connected to said hub, and in which said means for supplying oil to said clutch plates comprises a collector ring mounted on said flywheel, a conduit having an open end positioned adjacent to said collector ring for discharging oil from said collector ring into said hollow hub, and passages in said hub for directing oil against said clutch plates.

8. The lubricating system set forth in claim 1 in which said means for supplying oil to said clutch plates comprises a collector ring mounted on the periphery of said clutch and a conduit for discharging oil from said collector ring adjacent to the inner peripheries of said clutch plates and comprising means for directing oil from the outer peripheries of said clutch plates into said collector ring for recirculation to the inner peripheries of said clutch plates.

9. A lubricating system for a wet plate clutch having engageable and disengageable clutch plates for coupling and uncoupling a rotatable drive member and a rotatable driven member, said clutch plates having inner and outer peripheries, means for engaging and disengaging said clutch plates, a housing for said clutch having a sump for receiving oil, means responsive to rotation of said clutch for collecting oil, a conduit for discharging oil from said collecting means and directing said oil against the inner peripheries of said clutch plates for flow over said clutch plates and means for directing substantially all of the oil from said clutch plates directly into said collecting means without first passing through said sump for recirculation and flow of said oil over said clutch plates.

References Cited

UNITED STATES PATENTS

| | | | |
|---|---|---|---|
| 2,498,123 | 2/1950 | Hobbs | 192—113 |
| 3,104,746 | 9/1963 | Gadd et al. | 192—113 |
| 3,314,513 | 4/1967 | Lake et al. | 192—113 XR |
| 3,366,210 | 1/1968 | Webster | 188—264 XR |
| 3,366,211 | 1/1968 | May | 192—113 |

FRED C. MATTERN, JR., Primary Examiner

MANUEL ANTONAKAS, Assistant Examiner

U.S. Cl. X.R.

192—91